Patented July 25, 1933

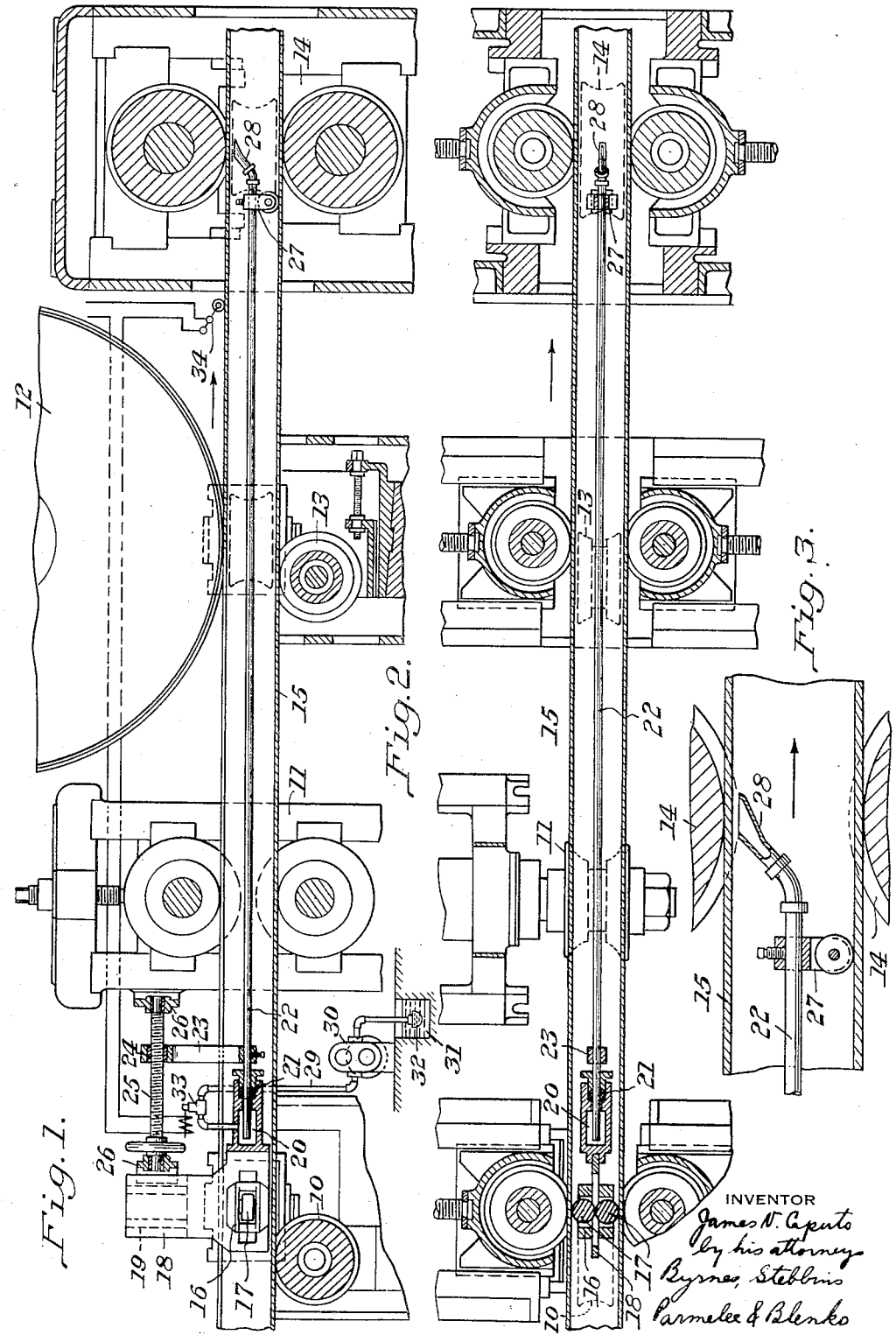

1,919,684

UNITED STATES PATENT OFFICE

JAMES V. CAPUTO, OF GIRARD, OHIO

PIPE FINISHING METHOD AND APPARATUS

Application filed July 8, 1931. Serial No. 549,443.

My invention relates to a method and apparatus for providing a finishing treatment for pipe and, in particular, pipe manufactured by the electric-resistance welding method.

It is well known that pipe welded by the above-mentioned method is characterized by the formation of a burr at the welded seam. Numerous expedients have been resorted to in the past for the removal of this burr, but all of them with which I am familiar have been found objectionable for various reasons. It is an object of this invention to provide means for getting rid of the burr formed in welding in a manner and by means such that the objections heretofore encountered will be overcome.

In accordance with my invention, I cool the interior of the welded seam artificially, for example, by a stream of cooling fluid directed thereagainst, and roll down the exterior burr by means of planishing rolls. By artificially cooling the interior of the welded seam, the latter becomes set so that it is not deformed by the planishing rolls. These rolls flatten the burr formed exteriorly of the seam and produce a finished product without any sign of exterior burr.

Any suitable fluid may be employed for the artificial cooling of the interior of the seam, but I prefer oil since it provides a protective coating for the interior of the pipe which preserves it from rust or corrosion. As an alternative to oil, it is also feasible to employ lacquer, varnish, or enamel which, when sprayed into the pipe, forms a smooth, unbroken, and permanent finish on the interior of the pipe. The exterior surface of the pipe may be finished with similar coating materials in any convenient manner.

The apparatus involved in the invention includes a conduit supported axially of the pipe being welded by means extending through the open seam cleft in that portion of the pipe which has not passed the welding electrode. A pump is employed to circulate the fluid through the conduit and a suitably directed jet at the end of the latter insures that the fluid will have the desired cooling effect.

For a complete understanding of the invention, reference is made to the accompanying drawing illustrating a present preferred embodiment of the apparatus by which the method is adapted to be performed. In the drawing, Figure 1 is a vertical sectional view, taken through the axis of a pipe being welded and showing parts in elevation;

Figure 2 is a horizontal sectional view, taken through the axis of the pipe; and Figure 3 is a partial sectional view similar to a portion of Figure 1, illustrating a detail thereof on a larger scale.

Referring in detail to the drawing, an electric-resistance welder comprises a stand of feed rolls 10, a second set of feeding and guiding rolls 11, a welding electrode 12, pressure rolls 13 therebelow, and a stand of planishing rolls 14. A pipe 15 is bent to cylindrical form from a flat plate and is fed into the welding apparatus with its open seam cleft uppermost.

As the pipe 15 advances through the feed rolls 10, it embraces a carriage 16 having side rolls 17. The carriage is supported on a plate 18 which extends downwardly through the open-seam cleft. The plate 18 is carried on brackets 19 extending upwardly from the frame in which the feed rolls 10 are journaled.

A tubular chamber 20 is connected to the plate 18 and is provided with a packing gland 21 in its outer end through which a conduit 22 extends.

An arm 23, extending through the seam cleft in the pipe, is secured to the conduit 22 adjacent the gland 21. The upper end of the arm 23 is provided with a head which carries a nut 24 therein. The nut 24 is traversed by a screw 25 journaled in suitable bearings 26 carried on the frames of the feed roll stands 10 and 11.

The conduit 22 extends from the tubular chamber 20 axially of the pipe 15 to a point substantially between the planishing rolls 14. The outer end of the conduit is supported by a roller bearing carriage 27. An upturned nozzle 28 directs fluid supplied through the conduit 22 against the interior of the welded seam.

Fluid is supplied to the chamber 20 through a system of piping 29, one end of which passes through the seam cleft in the pipe 15 by a pump 30. The pump 30 draws fluid from a reservoir 31 through a strainer 32.

The flow of cooling fluid may be controlled by an electro-magnetic valve 33 which operates in response to movement of a flag switch 34 adapted to be engaged by the pipe 15. An obvious control circuit is shown in Figure 1 and may be supplied from any convenient source of current. If desired, a time delay relay may be inserted in the circuit. By adjusting the position of the switch 34 or the setting of the time relay, or both, the flow of cooling fluid can be properly coordinated with the movement of the pipe. It will be desirable, of course, that fluid flow be established as soon as the leading end of the pipe enters the planishing rolls and that the flow of fluid be discontinued as the trailing end of the pipe enters said rolls.

In operation, the pump may be driven continuously, suitable drains being provided to collect the fluid that drips out of the welded pipe as it passes through the planishing rolls 14 and the finishing rolls therebeyond. Formed tube is introduced with its seam cleft uppermost so as to embrace the carriage 16 and to permit the plate 18 and the pipe 29 to enter the cleft. The arm 23 for adjusting the conduit 22 is likewise positioned in the same cleft. The pipe is then advanced to the feed rolls 11 and thence to the pressure rolls 13 and the electrode 12. At this point, the edges of the seam are heated and pressed together.

The welding operation forms a burr on the exterior of the welded seam, as is well known, and it is the function of the planishing rolls 14 to roll down this burr. The burr, obviously, is still highly heated when it approaches the planishing rolls and it is likely that the seam would be deformed or pressed within the outline of the pipe if it were attempted to roll down the burr under such conditions. In order to prevent deforming of the seam or the pipe adjacent thereto, the nozzle 28 is adjusted by means of the screw 25 so that the fluid stream traversing the conduit 22 impinges upon the interior of the welded seam substantially at or slightly in advance of the point of the exterior of the seam which is engaged by the planishing rolls. The effect of the impinging fluid, of course, is to cool the interior of the seam and to set the metal thereof so as to prevent deformation as a result of the engagement of the planishing rolls.

The flow of fluid is automatically controlled by the flag switch 34 and the electromagnetic valve 33, as above described.

As the trailing end of the pipe passes through the planishing rolls, the fluid collected therein drips out and may be collected by means of a system of drains and returned to the sump 31 so that it can be used again. A certain amount of the fluid, of course, adheres to the inner wall of the pipe and serves as a protection against rust. If desired, resilient means may be provided adjacent the planishing rolls 14 for supporting the free end of the conduit 22 against excessive downward bending, such resilient means being adapted to be displaced by the leading end of the pipe as it advances through the welder.

As previously stated, I prefer to employ oil as the cooling fluid, but other materials may be employed, such as varnish, lacquer, or enamel, which serve the dual purpose of cooling the interior of the seam and providing a permanent interior coating for the pipe. While an oil film on the interior of the pipe also has a protective effect, there are some uses to which pipe is put which require a coating of enamel or lacquer, and this invention is exceedingly well adapted for the provision of such a coating during the manufacture of the pipe.

Although I have illustrated and described but a single present preferred embodiment of the invention, it will be apparent that it may be practiced in other ways and by means of apparatus differing from that disclosed herein, without departing from the spirit of the invention as set forth in the appended claims.

I claim:

1. In an electric welding apparatus, a welding electrode and planishing rolls for smoothing the external burr formed at the weld, means for supplying cooling fluid to the interior of the welded seam, and means actuated by pipe moving through the apparatus for maintaining the flow of fluid.

2. A pipe welding apparatus including feed rolls, a welding electrode, and external seam planishing rolls, a fluid chamber, means for supporting the chamber in position to be embraced by a pipe traversing the apparatus, means for supplying fluid to the chamber, and a tube extending from said chamber axially of the pipe to a point beyond the zone in which the welding electrode engages the pipe.

3. A pipe welding apparatus including feed rolls, an electrode, and seam planishing rolls, a tubular chamber, means for supporting the chamber adjacent said feed rolls, and in position to be embraced by a pipe traversing the apparatus, a conduit disposed axially of the pipe and adjustably connected to said chamber, and means for supplying cooling fluid therethrough to the interior of the welded seam.

4. The combination with an electric pipe welder, of means for supplying cooling fluid to the interior of the welded seam, and means actuated by the pipe moving through the welder for starting the flow of said fluid.

5. In a method of finishing pipe while passing it through a continuous welder to unite the edges of an open seam cleft in a formed pipe, the steps including supplying coating fluid through the open seam cleft in the pipe to the interior of the pipe for providing a layer of coating material on the interior of the pipe.

6. In a method of finishing pipe having an axial welded seam, the steps including cooling the interior surface of the seam after welding until the metal of the seam is set sufficiently to withstand finish working, and finish working the exterior surface of the seam to impart a finish thereto.

7. In an electric welder, the combination with means for supplying welding current to a tube blank having an axial seam, means for closing and welding the seam, and means for finishing the exterior of the welded seam, of means between the current-supply means and the exterior finishing means effective to cool the interior of the seam and set the metal thereof preparatory to encountering said exterior finishing means.

JAMES V. CAPUTO.